United States Patent [19]

Houlihan

[11] 3,873,708
[45] Mar. 25, 1975

[54] N-SULFAMOYL-SUBSTITUTED-PIPERIDINES AS ANTI-TUSSIVE AGENTS
[75] Inventor: William J. Houlihan, Mountain Lakes, N.J.
[73] Assignee: Sandoz-Wander, Inc., Hanover, N.J.
[22] Filed: Mar. 19, 1973
[21] Appl. No.: 342,464

[52] U.S. Cl. ............................................. 424/267
[51] Int. Cl. ........................................... A61k 27/00
[58] Field of Search ................................... 424/267

[56] References Cited
UNITED STATES PATENTS
3,334,104    8/1967    Houlihan ..................... 424/267 X Primary Examiner—Albert T. Meyers
Assistant Examiner—Norman A. Drezin
Attorney, Agent, or Firm—Gerald D. Sharkin; Robert S. Honor

[57] ABSTRACT

Certain N-sulfamoyl-substituted-piperidines, e.g., N-sulfamoyl-4-phenylpiperidine, are useful as anti-tussive agents.

4 Claims, No Drawings

N-SULFAMOYL-SUBSTITUTED-PIPERIDINES AS ANTI-TUSSIVE AGENTS

This invention relates to the pharmaceutical activity of N-sulfamoyl-substituted-piperidines. More particularly, this invention concerns the use of N-sulfamoyl-substituted-piperidines in the treatment of coughs in mammals. The invention also relates to pharmaceutical compositions containing these compounds as an active ingredient thereof.

The active agents with which this invention is concerned may be represented by the following structural formula:

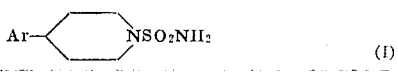

where Ar is

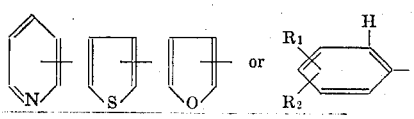

and where $R_1$ and $R_2$ each independently represent hydrogen, halo having an atomic weight of about 19 to 36, lower alkyl, i.e., alkyl having 1 to 4 carbon atoms, e.g., methyl, ethyl, isopropyl and the like, or lower alkoxy, i.e., alkoxy having 1 to 4 carbon atoms, e.g., methoxy, ethoxy, isopropoxy, and the like or $R_1$ and $R_2$ together represent methylenedioxy attached to adjacent carbon atoms.

The compounds of formula (I) above are known and may be prepared according to method disclosed in the literature from known materials, for example, as described in Example 8 of U.S. Pat. No. 3,334,104. The present invention contemplates only the novel use of such compounds as anti-tussive agents.

The compounds of formula (I) are useful in animals as antitussive agents as indicated by results obtained employing essentially the method descirbed by Winter and Flataker (J.P.E.T., 112:99, 1954). Guinea pigs are placed in individual chambers and exposed for 3 minutes to a constant pressure air-driven nebulized ammonia. Fresh solutions of 2.8% ammonia are used at each exposure. Cough responses are recorded via a venous pressure and/or a respiratory transducer onto a Grass polygraph. All animals are exposed in the chamber on the day prior to compound administration as a "conditioning" procedure. On the day of an experiment, the animals are exposed prior to compound administration and again at 1,3 and 5 hours following administration; in several instances, the procedure was repeated at 24 hours. Thus, the animals serve as their own controls and the effect of a compound on the cough response of each animal is related directly to its pre-drug response. Codeine and Nalline are administered to a limited number of animals for comparitive purposes.

The test compound is administered in doses of 6.25, −150 or 200 mg/kg. intragastrically via a stomach tube to guinea pigs. As mentioned above, all parameters are recorded with a Grass polygraph.

For such usage, the compounds may be administered orally as such or admixed with conventional pharmaceutical carriers. They may be administered in such forms as tablets, dispersible powders, granules, capsules, syrups, elixirs, lozengers, cough drops, chewing gum and the like. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch gelatin and acacia, and lubricating agents, e.g., magnesium stearate, stearic acid and talc. The tablets may be uncoated or coated by known techniques to delay disintetration and absorption in the gastrointestinal tract and thereby provide a sustained action over a longer period. Similarly, oral liquids, e.g., suspensions may contain the active ingredient in admixture with any of the conventional excipents utilized for the preparation of such compositions, e.g., suspending agents (methylcellulose), tragacanth and sodium alginate) wetting agents (lecithin, polyoxyethylene stearate and polyoxyethylene sorbitan mono-oleate) and preservatives (ethyl-o-hydroxybenzoate). Capsules may contain the active ingredient alone or admixed with an inert solid diluent, e.g., calcium carbonate, calcium phosphate and kaolin.

The dosage of the active ingredient employed for the anti-tussive use may vary depending on the severity of the condition being treated. However, in general, satisfactory results are obtained when the compounds of formula (I) are administered at a daily dosage of from about 1 milligram to about 200 milligrams per kilogram of animal body weight p.o. preferably given in divided doses two to four times a day, or in sustained release form. For most large mammals, the total daily dosage is from about 75 milligrams to about 1,500 milligrams administered orally p.r.n. for coughs to be taken no more frequently than four times per day.

Compounds of formula (I) which can be used as the active ingredient include the following:
1. N-sulfamoyl-4-(p-chlorophenyl)piperidine;
2. N-sulfamoyl-4-(p-fluorophenyl)piperidine;
3. N-sulfamoyl-4-(p-methylphenyl)piperidine;
4. N-sulfamoyl-4-(p-methoxyphenyl)piperidine;
5. N-sulfamoyl-4-(3,4-methylenedioxyphenyl)piperidine.
6. N-sulfamoyl-4-(4-pyridyl)piperidine;
7. N-sulfamoyl-5-(2-thienyl)piperidine;
8. N-sulfamoyl-4-(2-furyl)piperidine; and
9. N-sulfamoyl-4-phenyl piperidine, the latter being especially preferred.

The preferred compositions for prophylactic use from the standpoint of preparation and ease of administration are solid compositions, particularly hard-filled capsules and tablets containing from about 100 to 500 milligrams of the active ingredient.

EXAMPLES 1 AND 2

Tablets and Capsules Suitable for Oral Administration

Tablets and capsules containing the ingredients indicated below may be prepared by conventional techniques and are useful as anti-tussive agents at a dose of one tablet or capsule 2 to 4 times a day.

| Ingredient | Weight (mg) tablet | capsule |
|---|---|---|
| N-sulfamoyl-4-phenylpiperidine | 200 | 200 |
| tragacanth | — | |
| lactose | 227.5 | 300 |
| corn starch | 25 | |
| talcum | 15 | |
| magnesium stearate | 2.5 | |
| Total | 500 mg. | 500 mg. |

Tablets and capsules useful in the treatment of coughs may be prepared in a similar manner using compounds 1 to 8 above as the active ingredient.

EXAMPLE 3

Oral Liquid Suspension

The following pharmaceutical compositions are formulated with the indicated amount of active agent using conventinal techniques. The oral liquid suspension represents formulations useful as unit doses which may be administered as anti-tussive agents. The oral liquid suspension is suitable administered 2 to 4 times per day for this purpose.

| Ingredients | Weight (mg) liquid suspension |
|---|---|
| N-sulfamoyl-4-phenylpiperidine | 200 |
| sodium carboxy methyl cellulose U.S.P. | 12.5 |
| methyl cellulose | — |
| polyvinylpyrrolidone | — |
| lecithin | — |
| benzyl alcohol | — |
| magnesium aluminum silicate | 47.5 |
| flavor | q.s. |
| color | q.s. |
| methyl paraben, U.S.P. | 4.5 |
| propyl paraben, U.S.P. | 1.0 |
| polysorbate 80 (e.g. Tween 80), USP | 5 |
| sorbitol solution, 70%, USP | 2,500 |
| buffer agent to adjust pH for desired stability | q.s. |
| water | q.s. to 5 ml |

Similarly, oral liquid suspensions useful in the treatment of coughs may be prepared in the same manner using compounds 1 to 8 above as the active ingredient.

What is claimed is:

1. A method for treating coughs which comprises orally administering to a mammal in need of said treatment an anti-tussive effective amount of a compound of the formula

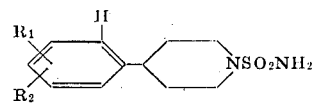

where

R₁ and R₂ each independently represent hydrogen, halo having an atomic weight of about 19 to 36, alkyl of 1 to 4 carbon atoms, alkoxy of 1 to 4 carbon atoms, or R₁ and R₂ together represent methylenedioxy attached to adjacent carbon atoms.

2. The method of claim 1 in which the compound is N-sulfamoyl-4-phenylpiperidine.

3. The method of claim 1 wherein the compound is administered orally at a daily dosage of from about 75 milligrams to about 1,500 milligrams.

4. The method of claim 1, wherein said compound is administered in a unit dosage form containing from about 100 milligrams to about 500 milligrams of said compound per unit.

* * * * *